United States Patent [19]

Rutledge et al.

[11] 4,069,413
[45] Jan. 17, 1978

[54] PROCESS MEASUREMENT AND CONTROL

[75] Inventors: Robert W. Rutledge; Franklin D. Ganaway, both of Bartlesville, Okla.

[73] Assignee: Phillips Petroleum Company, Bartlesville, Okla.

[21] Appl. No.: 736,905

[22] Filed: Oct. 29, 1976

[51] Int. Cl.$^2$ .................. G05B 11/42; G06G 7/57; G06G 7/58

[52] U.S. Cl. .................. 364/118; 23/230 A; 23/253 A; 318/609; 318/621; 364/121

[58] Field of Search ............ 235/151.12, 151.1, 150.1; 318/609, 610, 621, 622, 561; 208/DIG. 1; 23/230 A, 232 E, 253 A, 255 E

[56] References Cited

U.S. PATENT DOCUMENTS

| | | | |
|---|---|---|---|
| 3,020,490 | 2/1962 | Kleiss | 330/85 |
| 3,030,054 | 4/1962 | Lee et al. | 318/561 X |
| 3,509,729 | 5/1970 | Lupfer | 235/151.12 X |
| 3,558,045 | 1/1971 | Smith et al. | 235/151.12 |
| 3,648,031 | 3/1972 | Neal | 235/150.1 |
| 3,676,066 | 7/1972 | Pennington | 23/198 |
| 3,882,368 | 5/1975 | Carleton | 318/610 |

Primary Examiner—Joseph F. Ruggiero

[57] ABSTRACT

In the measurement of a variable process parameter and control of the process in response thereto, the time derivative of a second order or higher lagged process measurement signal is utilized to provide predictive capability in generating a process variable signal, in generating a process control signal, and in controlling the process in response to the measured parameter. The system is particularly well adapted to control of a non-self-regulating process.

27 Claims, 6 Drawing Figures

PROCESS MEASUREMENT AND CONTROL

This invention relates to an apparatus and method for generating a process variable signal in response to a measured process parameter. In another aspect the invention relates to an apparatus and method for generating a process control signal. In yet another aspect the invention relates to an apparatus and method for controlling a process. In still another aspect the invention relates to an apparatus and method for controlling an ammonia synthesis reaction. In another aspect the invention relates to an apparatus and method for incorporating effective derivative or predictive action into a process control system responding to an incrementally altered process measurement signal. In yet another aspect the invention relates to an apparatus and method for controlling a non-self-regulating process.

In the control of various processes, particularly processes comprising one or more chemical reactions, automatic regulation and control of the process must be based on information obtained directly or indirectly from observing or measuring process parameters which are capable of characterizing the process of providing useful information upon which a sound control strategy can be based. Many reaction characteristics such as temperature, pressures, flow rates, and the like can be measured continuously and substantially instantaneously. Other measurements can be realized only after the passage of some required period of time such as the time necessary to elute a sample of material through a chromatographic separation column and to determine the relative proportions of preselected constituents within the sample, for example. Among the variety of process measurements which can be used to characterize any particular reaction, some measurements or combinations of measurements may be used under appropriate conditions to generate predictive signals containing information which, based on the known process characteristics and other similar relevant circumstances, will permit the exercise of process control taking into consideration process trends as well as current process operating conditions. While it is advantageous to provide predictive information based on process measurements which are substantially instantaneous and continuous, it is also important to be able to use measurements which are realized only after a time delay as the basis for the generation of predictive signals containing process tend information. The ability to generate a signal representative of a process trend based on such a delayed measurement is, in fact, particularly important since some predictive information must be taken into account in order to provide control signal information which is abreast of current process conditions, and even additional predictive information must be provided if actual predictive control based on the delayed measurement is to be exercised.

A control system incorporating the generation of a predictive factor in conjunction with the measurement of process conditions and/or control of the process in response to measurement of such conditions can be advantageous in many processes. The need for predictive reaction to process measurements is particularly important, however, in a process which is non-self-regulating. In this sense, a self-regulating process can be defined as a process which, in response to a specified alteration of some process parameter, will exhibit a change from one stable, steady-state operating condition to a new stable, steady-state operating condition. A non-self-regulating process, on the other hand, is one in which a process parameter will result in an unstable condition wherein the change initiated by the alteration of a process parameter will continue to take place unless additional suitable control action is exercised to alter the process operation.

Accordingly, an object of the invention is to provide an apparatus and method for generating a process variable signal in response to a measured process parameter. Another object of the invention is to provide an apparatus and method for generating a process control signal. Yet another object of the invention is to provide an apparatus and method for controlling a process. Still another object of the invention is to provide an apparatus and method for controlling an ammonia synthesis reaction. Another object of the invention is to provide an apparatus and method for incorporating effective derivative or predictive action into a process control system responding to an incrementally altered process signal. Yet another object of the invention is to provide an apparatus and method for controlling a nonself-regulating process.

In accordance with the invention a process measurement signal is modified to produce a process variable incorporating predictive information. Such modification is accomplished by applying a second or higher order lag factor to the present measurement signal to produce a lagged process measurement signal, then generating a signal which is the time derivative of the lagged signal to produce a derivative signal and adding the derivative signal to the original process measurement signal to produce a process variable signal incorporating predictive or process tend information. The process variable signal thus produced can thereafter be utilized as a variable input to a process controller or in any other suitable manner as the basis for the generation of a process-altering action. The apparatus and method of the invention are particularly well suited for use in conjunction with control of a non-self-regulating reaction and/or control in response to a delayed measurement signal and/or control in response to a signal which is subject to incremental alteration. The process variable signal generated in accordance with the invention incorporates a predictive term which is continuous even though the process measurement signal from which the process variable signal is generated may exhibit a step change.

Additional objects and advantages of the invention will be apparent from the following detailed description of the drawing illustrating a preferred embodiment of the invention, from the specification as a whole, and from the claims appended hereto.

Referring to the drawing.

Figure 1:
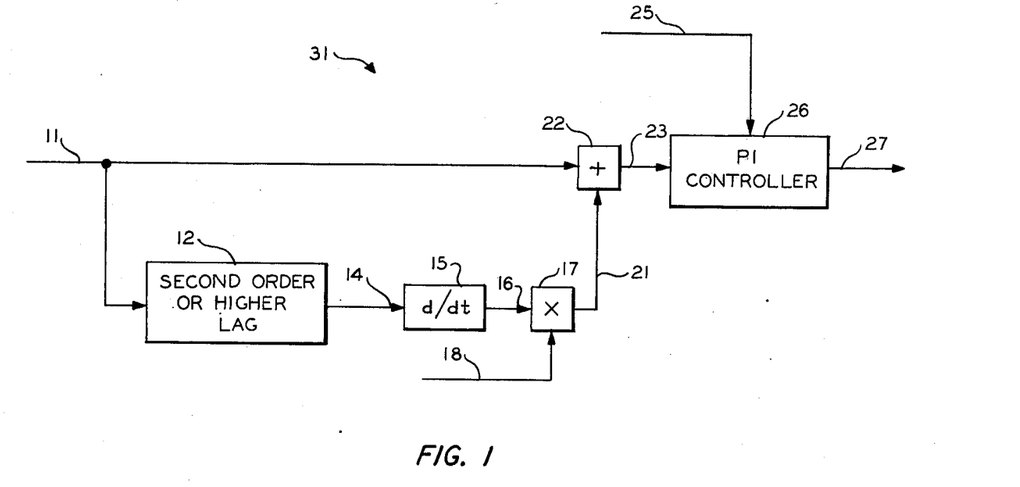
FIG. 1 is a schematic block diagram of the apparatus and method for generating a process control signal in accordance with the invention.

Referring now to FIG. 1, a process measurement signal 11 representative of the value of a measured process parameter is provided by any suitable means. The process measurement signal 11 can be instantaneous or delayed and can be either continuous or subject to incremental changes. A second order or higher lag means 12 receives the process measurement signal 11 and generates in response thereto a lagged process measurement signal 14. A first order lag can be generally defined as an element having a response to a unit step input which exhibits the general relationship $$O(t) = I(t)(1 - e^{-t/C})$$

where $O(t)$ is the time domain lagged output signal, $I(t)$ is the time domain input signal, t is time, e is the natural or Napierian logarithm base, 2.7128 ..., and where C is a constant. In dealing with higher order lags it is appropriate, and convenient, to express the characteristics of lag elements in the Laplace transform S domain. In the S domain, the above relationship becomes $$O(S) = I(S)(1/C\,S+1)$$

where $O(S)$ and $I(S)$ are the respective S domain output and input signals, and C is as previously defined. In the S domain higher order lags having a single lag time constant will fulfill the general condition $$O(S) = I(S)\left[\frac{K^{1/n}}{CS+1}\right]^n$$

where $O(S)$ and $I(S)$ are as previously defined, n is an integer greater than one, and C and K are constants. For second or higher order lags having possibly differing time constants, the S domain relationship between output and input signals can be expressed as $$O(S) = I(S)\left(\frac{K_1}{C_1S+1}\right)\left(\frac{K_2}{C_2S+1}\right)\left(\frac{K_3}{C_3S+1}\right)\cdots\left(\frac{K_n}{C_nS+1}\right)$$

where $O(S)$ and $I(S)$ are as previously defined and $C_1$, $C_2$, $C_3$ ... $C_n$ and $K_1$, $K_2$, $K_3$ ... $K_n$ are constants.

The second order or higher lag means 12 can be any suitable means for generating a lagged process measurement signal which exhibits a response to a unit step change of the process measurement signal of the general form $$M_{pl}(S) = M_p(S)\left(\frac{K_1}{C_1S-1}\right)\left(\frac{K_2}{C_2S-1}\right)\cdots\left(\frac{K_n}{C_nS-1}\right)$$

where $M_p$ is a process measurement signal 11, $M_{pl}$ is the lagged process measurement signal 14, $C_1, C_2, \ldots C_n$ and $K_1, K_2, \ldots K_n$ are constants, and n is an integer greater than one. Although the use of a second order lag means wherein $$M_{pl}(S) = M_p(S)\left(\frac{1}{C_1S-1}\right)\left(\frac{1}{C_2S-1}\right)$$

is presently preferred, higher order lag means can also be used as long as such use is suitable under the circumstances and compatible with the control system in which it is utilized. As a practical matter, very high order lag means will ordinarily not be advantageous since the transfer function of the lag means 12 under such circumstances will tend to approach a pure deadtime delay and will begin to lose the advantage of providing a substantially continuous respons to a step change in the process measurement signal 11.

A differentiator means 15 accepts the lagged process measurement signal 14 and delivers in response thereto a derivative signal 16 representative of the time derivative of the lagged process measurement signal 14. A multiplying means 17 thereafter applies a scaling factor 18 to the derivative signal 16 to produce a scaled derivative signal 21. The scaling factor signal 18 can be either greater than or less than 1, or can be equal to 1, but will not be 0.

An adding means 22 accepts the process measurement signal 11 and the scaled derivative signal 21 as inputs thereto and generates a process variable signal 23 representative of the sum of the process measurement signal 11 and the scaled derivative signal 21. The process variable signal 23 will preferably fulfill the general condition $$V_p = K_1 M_p + K_2 \frac{dM_{pl}}{dt}$$

where $V_p$ is the process variable signal 23, $M_p$ is the process measurement signal 11, $M_{pl}$ is the lagged process variable signal 14, t is time, and $K_1$ and $K_2$ are constants. In a broader sense, the process variable signal 23 is representative of the weighted sum of the process measurement signal 11 and the derivative signal 16. Although application of a scaling factor to the derivative signal 16 in order to achieve such a weighted sum has been illustrated and is presently preferred for the purpose of using the value of the processmeasurement signal 11 as the basis for control signal scaling and reference for control system continuity, a scaling factor could be applied to either the process measurement signal 11 or the derivative signal 16 or to both such signals in order to produce a summed process variable signal 23 exhibiting the desired weighted relationship in the addition of the two signals.

Generation of the derivative signal 16 representative of the time derivative of th laggd process measurement signal 14 incorporates into the derivative signal 16 information suitable for indicating a prediction or delineating a trend of the process measurement signal 11. This predictive information, when combined in a suitable weighted relationship with the process measurement signal 11 will yield a process variable signal 23 which, depending upon the specific parameters and operating characteristics of the controlled proces and upon the desired degree of predictive control, can be prepresentative of the predicted value of the process measurement signal at some future time, the present value of the measured process variable based on a measurement incorporating an inherent delay of some type, or any other similar purpose for which the available degree of predictive capability is suited.

The use of a second order or higher lag means 12 is essential to the proper operation of the versatile predictive capabilities of the invention. The use of no lag means whatsoever would obviously result in a derivative signal which would consist of nothing more than an essentially instantaneous spike whenever presented with a process measurement signal exhibiting a step change of any kind, and such an instantaneous spike would be of no use in the generation of a predictive component for the process variable signal 23. Use of a first order lag would do away with the instantaneous spike in the derivative signal but would still present a substantial discontinuity in the derivative signal whenever presented with a step change in the process measurement signal 11 and would provide, in response to such a step change in the process measurement signal 11, a derivative signal component which would begin at a relative high or low extreme and decay to a less extreme value. The use of second and higher order lag means, however, provides a derivative signal 16 which presents its predictive information not in the form of a spike of theoretically infinite amplitude nor as an immediate transition to a finite but abrupt change in value in respone to a step change in the process measurement signal 11, but provides a derivative signal 16 which responds to a step change in the process measurement signal 11 in a much more controlled manner. This type of controlled derivative signal 16, produced when a second order or higher lag means 12 is utilized, will, when incorporated into a process variable signal 23, provide predictive information within the process variable signal 23 which will not cause undeu disruption of the control system or process with which it is used. In addition, the use of a second or higher order lag means 12 provides additional freedom in tuning the constants associated with the lag means 12 to provide optimum interaction with the process and process control system utilized.

The process variable signal 23 generated in accordance with the invention can be utilized in any suitable manner for control of a process. As illustrated by FIG. 1, a presently preferred manner of utilizing the information contained within the process variable signal 23 is to provide the signal and a set point signal 25 as inputs to a standard proportional-integral controller means 26 which produces a process control signal 27 in response to the difference between the process variable signal 23 and the set point signal 25. The presently proposed process control signal 27 is one which satisfies the general conditions $$C_p = K_3 (V_p - SP) + K_4 \int (V_p - SP) \, dt$$

where $C_p$ is the process control signal 27, $V_p$ is the process variable signal 23, SP is the set point signal 25, $t$ is time, and $K_3$ and $K_4$ are constants. In accepting a process measurement signal 11 and delivering in response thereto a process control signal 27, the apparatus illustrated schematically by FIG. 1 acts as a controller means 31 which can be substituted for a conventional controller or otherwise used to perform the control functions ordinarily performed by other controller means.

Figure 2:
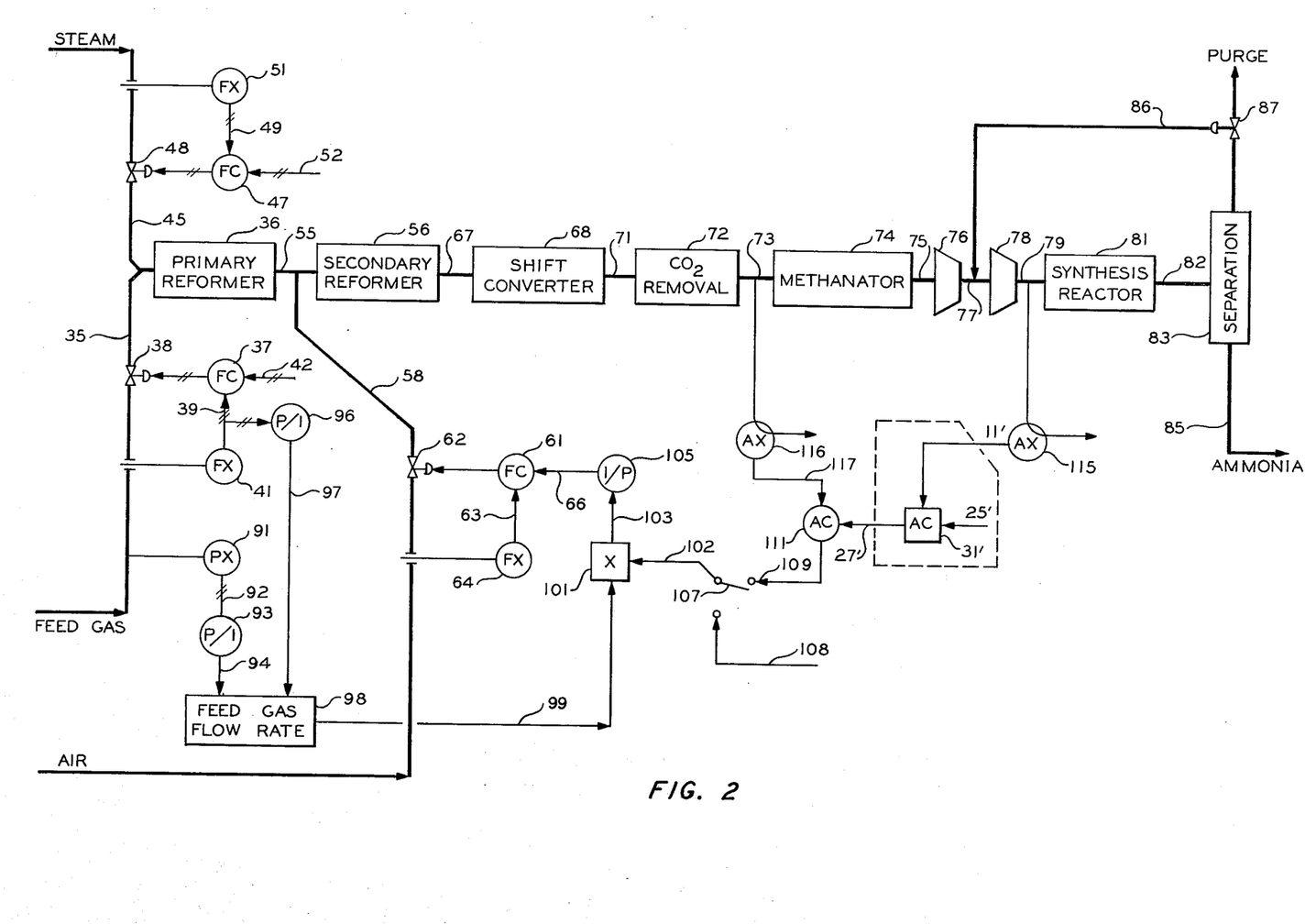
FIG. 2 is a schematic block diagram of the advantageous use of the method and apparatus of the invention in the control of a chemical reaction process.

One way in which the apparatus and method of the invention can be applied in controlling a process is illustrated by FIG. 2. The process schematifally illustrated by FIG. 2 is an ammonia synthesis process. In the process, a stream of natural gas or other light hydrocarbon material is introduced through a conduit means 35 which communicates with the inlet of a primary reformer means 36. The flow through the conduit means 35 is maintained at a predetermined rate by a flow controller 37 which regulates a valve means 38 in response to a comparison of a measured feed gas flow rate signal 39 delivered by a flow rate transducer means 41 and a gas flow rate set point signal 42 representative of a desired feed gas flow rate.

Steam is introduced through a conduit means 45 which also communicates with the inlet of the primary reformer means 36. A predetermined flow through the conduit 45 is maintained by a flow controller 47 which regulates a valve 48 in response to a comparison of a steam flow rate signal 49 generated by a flow rate transducing means 51 and a stream flow rate set point signal 52.

The effluent from the primary reformer 36 is directed through a conduit means 55 to he inlet of a second reformer means 56. Air or other nitrogen-contining gas is introduced through a conduit means 58 which also communicates with the inlet of the secondary reformer means 56. The flow of air through the conduit means 58 is regulated by a flow controller means 61 which adjusts a valve means 62 in response to a comparison of an air flow rate signal 63 delivered by an air flow rate transducing means 64 and an air flow rate set point signal 66 which can be generated as hereinafter described.

In a typicl operation, approximately 65 percent of the hydrocarbon present in the feedstream introduced through the conduit means 35 are converted to hydrogen, carbon monoxide, and carbon dioxide in the primary reformer means 36. As will be explained hereafter in greater detail, the amount of air introduced through the conduit means 58 is regulated to give a desired ratio of hydrogen to nitrogen in one or more portions of the downstream reaction. Additional hydrocarbon are converted in the secondary reformer means 56. The effluent from the secondary reformer means 56 is passed through a conduit means 67 to a shift converter means 68 wherein carbon monoxide and steam are converted to additional hydrogen and carbon dioxide. The effluent from the converter means 68 is directed through a conduit means 71 to carbon dioxide removal equipment 72. Carbon dioxide is typically removed by absorption with monoethanol amine. The effluent from the carbon dioxide removal means 72 is directed through a condut means 73 to the inlet of a methanator means 74 in which the final carbon dioxide residues, which would act as a catalyst poison in the following synthesis reaction, are converted to methane, which cats as an inert material in the succeeding ammonia synthesis reaction. The effluent from the methanator means 74 is passed through a conduit means 75 to a first compressor means 76 which delivers a compressed effluent stream therefrom through a conduit means 77 to the inlet of a second compressor means 78.

The compressed gases from the second compressor means 78 are directed through a conduit means 79 to a synthesis reactor 81 in which hydrogen and nitrogen are converted to ammonia. The effluent from the reactor 81 is directed through a conduit means 82 to a separation means 83 wherein the ammonia product is separated from unreacted gases. An ammonia product stream is removed from the separation means 83 through a conduit means 85. The unreacted gases are directed through a conduit means 86 to the inlet of the second compressor means 78 where they are recompressed and reintroduced into the synthesis reactor 81. A portion of the uncoverted gases may be bled from the conduit means 86 by a purge valve means 87 as necessary to prevent undesirable buildup of inert gases carried by the recycled unreacted gases to the synthesis reactor 81.

The process of FIG. 2 thus far described constitutes a typical ammonia-producing operation of a type well known in the art. This reaction is one in which the apparatus and method of the invention are particularly useful for control purposes. In the control scheme illustrated by FIG. 2, a pressure transducer means 91 provides a feed gas pressure signal 92 representative of the pressure within the conduit means 35. The pressure signal 92 is then converted by a pressure/current transducer means 93 to an equivalent electrical feed gas pressure signal 94. A second pressure/current transducer means 96 converts the feed gas flow rate signal 39 to an equivalent electrical signal 97. Both the feed gas flow rate signal 97 and feed gas pressure signal 94 are provided to a feed gas flow rate correction means 98 which modifies the flow rate signal 97 to provide a corrected or standardized feed gas flow rate signal 99. The correction applied by the flow rate correction means 98 can be based on empirical or theoretical relationships between feed gas delivery pressure and a standard flow rate such as the mass flow rate of feed gas material. Although correction for pressure only is illustrated by FIG. 2, additional correction for feed gas temperature and/or other similar variables could be made as necessary or desirable for a particular installation or reaction. The implementation of the correction factor application by the correction means 98 can be accomplished using standard analog or digital techniques.

The corrected feed gas flow rate signal 99 is used as illustrated by a multiplying means 101 to convert a set point signal 102 representative of the desired ratio of air to fuel to be provided to the reaction into an air flow rate set point signal 103. The air flow rate set point signal 103 is then converted from electrical to pneumatic format by a current/pressure transducer means 105 to produce the pneumatic air flow rate set point signal 66.

The air to gas flow rate ratio set point signal 102 is selected by a switch means 107 from a fixed set point signal 108 and a generated set point signal 109.

The generated air to gas flow rate ratio set point signal 109 is generated in response to a cascade control system wherein the output signal 27' of a controller means 31' is used as a set point signal to a second controller means 111. The output signal of the second controller means 111 is the generated set point signal 109.

An analysis transducer means 115 accepts a sample of material flowing through the conduit means 79 to the synthesis reactor 81 and generates analysis signal 11' representative of the ratio of hydrogen to nitrogen entering the synthesis reactor 81. The analysis controller 31' produces, in response to a comparison of the measured hydrogen to nitrogen ratio represented by signal 11' and a required hydrogen to nitrogen ratio represented by a set point signal 25' a controller output signal 27' representative of the required hydrogen to nitrogen ratio in the fresh feed provided to the synthesis reactor loop. A second analysis transducer means 116, in response to a sample of material from the conduit means 73 connecting the carbon dioxide removal means 72 and the methanator means 74, generates and delivers analysis signal 117 representative of the hydrogen to nitrogen ratio in the fresh feed to the synthesis reaction. The analysis controller 111, in response to a comparison of the analysis signal 117 and the required analysis set point signal 27' generates the set point signal 109 representative of the ratio of air flow feed gas flow necessary to provide the required hydrogen to nitrogen ratio in the fresh feed stream. Although the measurement of fresh feed content at the conduit 73 entering the methanator 74 is illustrated and is presently preferred, measurement of the hydrogen to nitrogen ratio within the conduit means 75 to provide an indication of fresh feed hydrogen to nitrogen ratio would be equally acceptable. While the methanator means 74 may utilize a small amount of free hydrogen in converting the remaining carbon dioxide to methane, the ratio of hydrogen to nitrogen in either of the conduit means 73 or 75 can be used for the purpose of control in accordance with the control scheme of FIG. 2.

The use of two analysis controllers utilizing separate measurements within the synthesis reactor loop and outside the synthesis reactor loop for the fresh feed entering the reaction loop is desirable since the hydrogen to nitrogen ratio required in the fresh feed will not necessarily be the same as that required within the material entering the synthesis reactor 81. For example, the required hydrogen to nitrogen ratio in the synthesis reactor will not necessarily be the three to one mol ratio in which the two gases combine to form ammonia due to the fact that hydrogen and nitrogen have different solubilities in the ammonia product with nitrogen being more soluble than hydrogen in ammonia. The ammonia product leaving the separator 83 will therefore not contain an exact three to one ratio of hydrogen to nitrogen since the amount of dissolved nitrogen will proportionally higher than the amount of dissolved hydrogen in the product. Whatever the desired ratio of hydrogen to nitrogen entering the synthesis reactor 81, it can readily be seen that departure from this desired ratio will require an alteration of the desired ratio of hydrogen to nitrogen in the fresh feed in the reactor. It can also be readily seen, however, that the average ratio of hydrogen to nitrogen in the fresh feed material is necessarily substantially the same as the hydrogen to nitrogen ratio exiting the separator 83 through the ammonia product conduit means 85. In addition, the amoung of fresh feed entering the reaction loop is ordinarily several times less than the amount of recycled material flowing through the conduit means 86. It can therefore be readily seen that the reaction is of a non-self-regulating nature in that modification of the hydrogen to nitrogen ratio in the fresh feed in order to maintain optimum reaction conditions within the synthesis reactor 81 will result in a buildup of either hydrogen or nitrogen within the reaction loop unless additional subsequent action is taken. Using the particular control system illustrated by FIG. 2, the problem of potential instability is more acute since the use of chromatographic analysis equipment to generate the hydrogen to nitrogen ratio signals 11' and 117 results in a delay between the time which a sample is taken from the process and the time which the constituent ratio information is available for control use. In addition the chromatographic analysis equipment produces an output signal whihc is subject to incremental alteration at the end of each analysis cycle.

In the control system illustrated by FIG. 2, the analysis controller means 31', shown enclosed by a dashed line, is preferably constructed utilizing the apparatus and method of FIG. 1. The controller means 31' and signals 11', 25' and 27' of FIG. 2 can therefore be the corresponding controller 31 with respective signals 11, 25, 27 of FIG. 1.

The predictive information incorporated into the output signal 27' of the controller means 31' when the apparatus and method of the invention are used in implementing the analysis controller 31' will, by offsetting the delay of the analysis equipment in generating the signal 11' and by avoiding disruptive instantaneous changes in the derivative portion of the output signal 27', provide a set point signal to the analysis controller 111 representative of the anticipated need of the hydrogen to nitrogen content in the fresh feed and thereby avoid possible disruptive or oscillatory changes in the process conditions.

Although the control of the process illustrated by FIG. 1 utilizing a combination of pneumatic and electrical signals has been illustrated, a variety of signals and signal formats can be utilized in equivalent embodiments of the invention. The electrical portion of the control system can be electrical analog, digital electronic, or a combination thereof, or any other suitable information handling system. Presently preferred apparatus for implementation of the electrical portion of a control system utilizing the apparatus and method of the invention is an electrical analog system. A preferred implementation of the apparatus of FIG. 1 suitable for use as the analysis controller 31' of FIG. 2 is illustrated by FIGS. 3–6.

Figure 3:
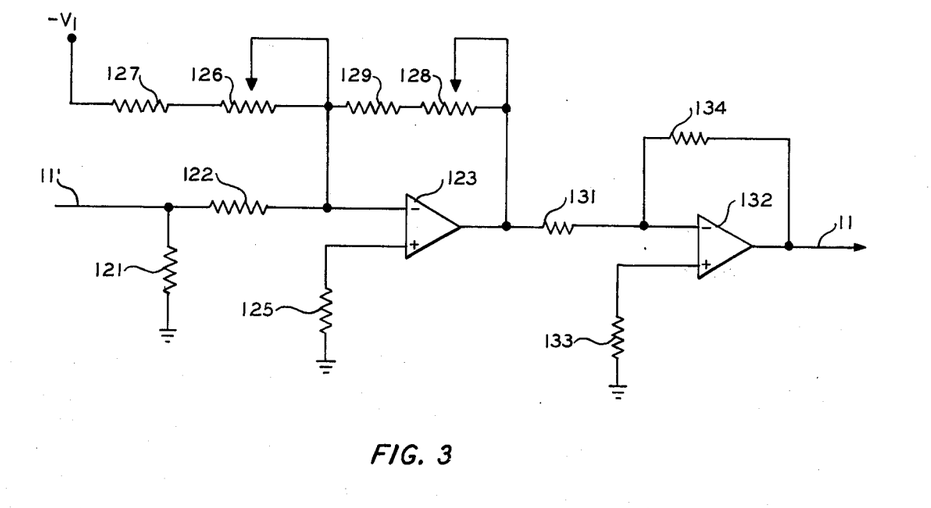
FIGS. 3–6 are schematic electrical diagrams illustrating preferred analog implementations of the apparatus of FIG. 1.

In FIG. 3 there is illustrated an electrical analog circuit wherein a raw process measurement signal 11' can be scaled and adjusted, if necessary, to be compatible with the range and format of the components from which the controller means 31' is constructed. The raw measurement signal 11' is applied through a resistor 121 to ground and through a resistor 122 to the inverting terminal of an operational amplifier 123. The noninverting terminal of the operational amplifier 123 is connected through a resistor 125 to ground. The inverting input terminal of the operational amplifier 123 is connected through a variable resistance 126 and additional resistor 127 to a negative voltage reference, $-V_1$. The variable resistor 126 provides zero adjustment of the output signal of the amplifier 123. A variable resistance 128 in series with a resistor 129 connected between the output of the amplifier 123 and the inverting input thereof provides span adjustment.

The output of the operational amplifier 123 is applied through a resistor 131 to the inverting input terminal of an operational amplifier 132. The noninveerting terminal of the amplifier 132 is connected through a resistor 133 to ground, and the output terminal of the amplifier 132 is connected through a resistor 134 through the inverting input terminal thereof. While the resistors 131 and 134 can be of different values in order to apply an additional scaling factor, it is preferred that all necessary scaling take place through adjustment of the resistor 128 associated with the amplifier 124 and that resistors 131 and 134 be of substantially the same value in order to permit the operational amplifier 132 to perform the function of a simple signal inversion. While the use of the circuit illustrated by FIG. 3 may not be necessary in all cases, such a circuit is preferably provided in order to make possible the acceptance of various raw process measurement signals 11' and to deliver in response thereto scaled signals of the same polarity which have been suitably scaled and related to a chosen reference or zero point.

Figure 4:
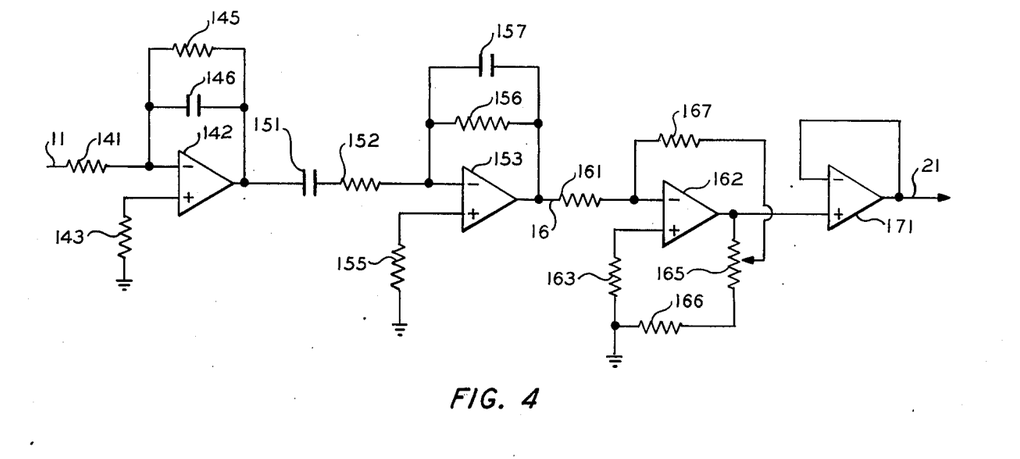

FIG. 4 illustrates the apparatus by which the refined process measurement signal 11 from the output of the amplifier 132 of FIG. 3 can be used to generate the derivative signal 16 of FIG. 1. The signal 11 is applied through a resistor 141 to the inverting input of an operational amplifier 142. The noninverting input of the amplifier 142 is connected through a resistor 143 to ground, and the output of the amplifier 142 is connected through the parallel combination of a resistor 145 and a capacitor 146 to the inverting input terminal thereof.

Although the parallel combination of the resistor 145 and capacitor 146 can be used to impart a lag to the signal 11, the presently preferred embodiment of the invention utilizes a relatively small capacitor 146 so that the circuit associated with the amplifier 142 provides signal inversion and a desired, but relatively small, amount of signal conditioning. While the lag and derivative portions of the signal modification can be accomplished separately, the circuit illustrated in FIG. 4 is particularly preferred for its ability to provide both second order lag and derivative action using a minimum of circuitry. The signal appearing at the output of the operational amplifier 142 is supplied to a basic analog differentiator circuit having an additional series resistor in the input circuit and an additional parallel capacitor in the feedback circuit. The addition of these components provides two lag factors in addition to the derivative action of the input capacitor and feedback resistor. The output signal from the operational amplifier 142 is provided through the series combination of a capacitor 151 and a resistor 152 to the inverting input of an operational amplifier 153. The noninverting input of the amplifier 153 is connected through a resistor 155 to ground. The output of the amplifier 153 is connected to the inverting input thereof through the parallel combination of a resistor 156 and a capacitor 157. The output of the operational amplifier 153 will therefore exhibit substantially the same relationship to the output of the amplifier 142 as would be accomplished by separately applying a second order lag to the output of amplifier 142 and differentiating the lagged signal. One lag time constant will be determined by the value of capacitor 151 and resistor 152, the second lag time constant will be determined by the values of capacitor 157 and resistor 156, and the derivative time constant will be determined by the values of capacitor 151 and resistor 156.

In order to provide scaling of the magnitude of the differentiated signal received from the output of amplifier 153, the amplifier 153 output is connected through a resistor 161 to the inverting input of an operational amplifier 162. The noninverting input terminal of the amplifier 162 is connected through a resistor 163 to ground. The output of the amplifier 162 is connected through the series combination of a potentiometer resistor 165 and a resistor 166 to ground. The sweep terminal of the potentiometer 165 is connected through a resistor 167 to the inverting input terminal of the amplifier 162. Adjustment of the effective feedback resistance of the amplifier 162 by adjustment of the potentiometer 165 will permit substantial adjustment of the gain of the amplifier 162 in order to perform at least a portion, and preferably all, of the scaling of the derivative signal 16 necessary to provide the desired relationship between the scaled derivative signal 21 and the process measurement signal 11. The output of the operational amplifier 162 is provided to the noninverting input of an operational amplifier 171. The output of the amplifier 171 is connected directly to the inverting input thereof so that the amplifier 171 provides a unity gain voltage follower or buffer effect to present the output of the amplifier 162 as a scaled derivative signal 21 suitable for use by other control equipment without interference with the operation of the amplifier 162 or other circuits of FIG. 4.

As previously indicated, the capacitor 146 is, in the presently preferred embodiment, sufficiently small that no substantial lag effect is provided by its presence within the circuit. If, however, a lag of higher order than the presently preferred second order lag is desired, the size of the capacitor 146 can be increased to produce such a lag and/or other circuitry suitable for introducing a desired degree of lag into the process measurement signal 11 prior to its application to the circuitry associated with the operational amplifier 153 can be provided.

Figure 5:
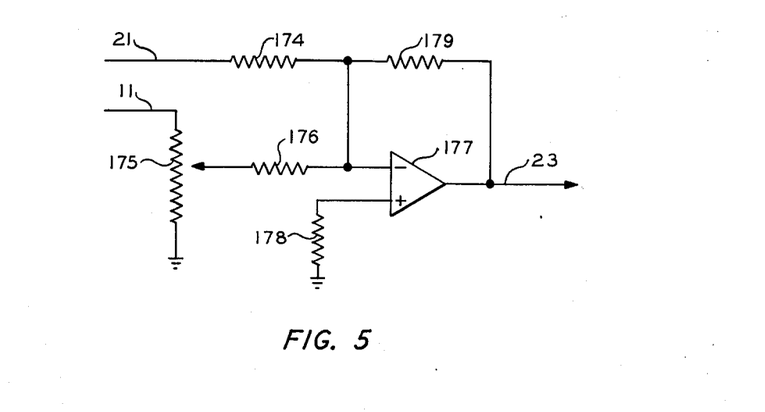

FIG. 5 illustrates the presently preferred circuitry by which the adding means 22 of FIG. 1 can be implemented. The process measurement signal 11 is applied through a potentiometer 175 to ground with the sweep terminal of the potentiometer 175 being connected through a resistor 176 to the inverting terminal of an operational amplifier 177. The scaled derivative signal 21 is applied through a resistor 174 to the inverting terminal of the amplifier 177. The noninverting input of the amplifier 177 is connected through a resistor 178 to ground, and the output of the amplifier 177 is connected through a resistor 179 to the inverting input thereof. While the resistors 174 and 179 and the combination of the potentiometer 175 and the resistor 176 can be adjusted to provide effective scaling of the scaled derivative signal 21 and the process measurement signal 11, it is preferred that all scaling of those signals be accomplished elsewhere, such as by the scaling amplifier 123 of FIG. 3 in the case of the process measurement signal 11 and by the scaling amplifier 162 of FIG. 4 in the case of the scale derivative signal 21, and that the amplifier 177 of FIG. 5 operate solely as an adder to provide an output process variable signal 123 representative of the sum of the process measurement signal 11 and scaled derivative signal 21. The combination of the potentiometer 175 and resistor 176 will therefore ordinarily have exactly the same equivalent resistance as the resistor 174. In many circumstances it would, of course, be acceptable to apply both signals 21 and 11 to the inverting input of the amplifier 177 through identical resistors. In the particular embodiment illustrated by FIG. 5, however, the potentiometer 175 is provided for the purpose of making any minor correction which may be necessary in the scaling of the process measurement signal 11 arising from the fact that after the signal was originally scaled it was inverted by the amplifier 132 of FIG. 3. Any minor scaling error introduced as a result of the effective gain of the amplifier 132 not being exactly minus one is preferably corrected by adjustment of the potentiometer 175 so that the effective process measurement signal 11 presented to the amplifier 177 is as close as possible to exactly the same magnitude as the output of the amplifier 123. In addition, the magnitude of the effective gain of the amplifier 177 is preferably one, with the inherent inversion of the amplifier making the actual gain equal to minus one, so that the process variable signal 23 is accurately representative of the value of the process measurement signal 11 which has added thereto a scaled derivative signal having lag and derivative characteristics determined by the circuitry associated with the amplifiers 142 and 153 of FIG. 4 and having a magnitude determined by the circuitry associated with the amplifier 162 of FIG. 4. Adjustment of the potentiometer 165 associated with the operational amplifier 162 will determine the overall magnitude of the scaled derivative signal 21 and will therefore determine the amount of derivative component incorporated within the process variable signal 23.

Figure 6:
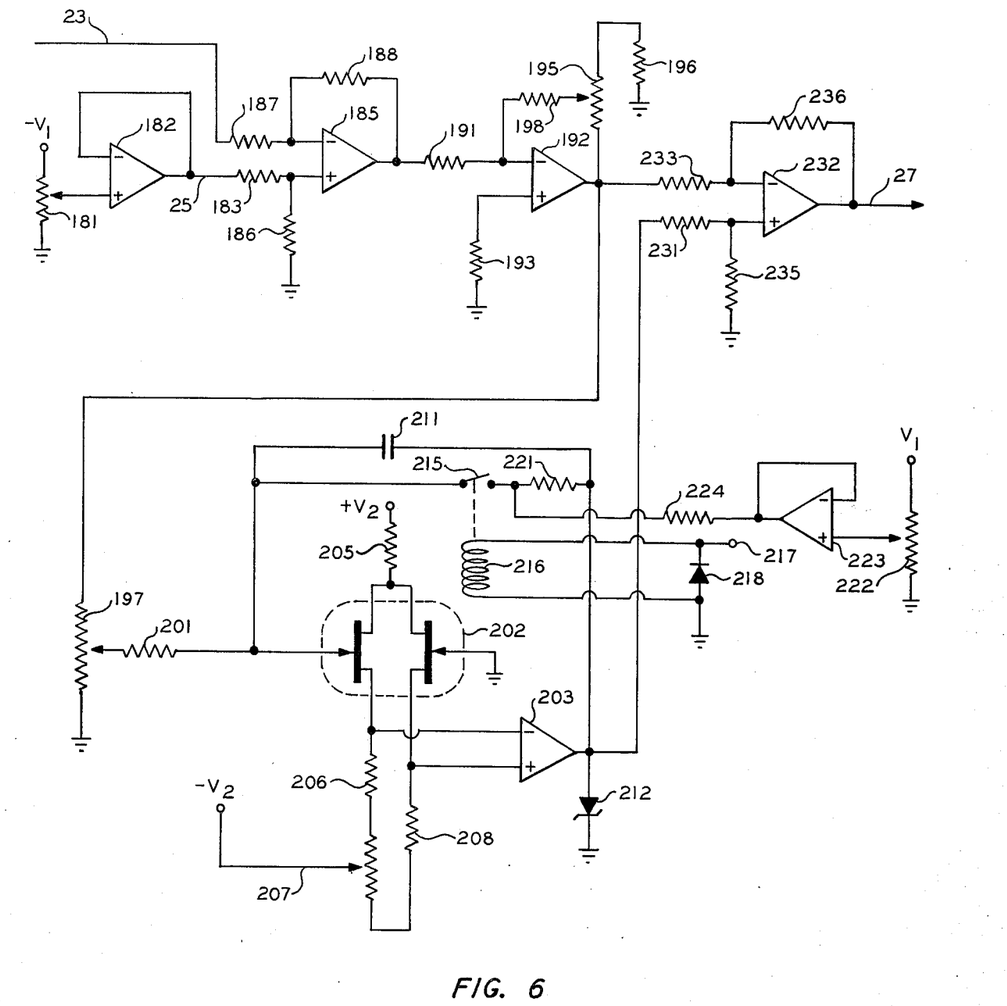

FIG. 6 illustrates a preferred electrical analog proportional-integral controller circuit by which the process variable signal 23 is utilized to produce a suitable process control signal 27. A potentiometer 181 is connected between a suitable reference voltage $-V_1$ and ground with the sweep terminal of the potentiometer 181 being adjusted to provide a set point signal 25 by delivering the required voltage to the noninverting input of an operational amplifier 182. The amplifier 182 is connected as a unity gain voltage follower or buffer amplifier with the output thereof connected directly to the inverting input terminal of the amplifier so that an amplifier output signal representative of the selected set point output signal 25 can be delivered without interference of the operation of the potentiometer 181 or voltage source $-V_1$. The output of the amplifier 182 is applied to a resistor 183 to the noninverting input of an operational amplifier 185. The noninverting input of the amplifier 185 is also connected to ground through a resistor 186. The process variable signal 23 is applied to the inverting input of the operational amplifier 185 through a resistor 187, and the output of the amplifier 185 is connected to the inverting input thereof through a resistor 188. Resistors 183, 187, and 188 are preferably of substantially equal value so that the output signal of the amplifier 185 is representative of the difference between the process variable signal 23 and the set point signal 25.

The output of the operational amplifier 185 is connected through a resistor 191 to the inverting input of an operational amplifier 192. The noninverting input of the amplifier 192 is connected to a resistor 193 to ground. The output of the operational amplifier 192 is connected through a first potentiometer 195 in series with a resistor 196 to ground and is also connected through a parallel potentiometer 197 to ground. The sweep terminal of the potentiometer 195 is connected through a resistor 198 to the inverting input of the amplifier 192. The voltage divider capability of the potentiometer 195 in conjunction with the feedback resistor 198 makes it possible to adjust the effective gain of the amplifier 192 over a substantial range. The gain of the amplifier 192 is in effect the proportional gain of the controller, and adjustment of the potentiometer 195 to determine the proportional gain of the controller is preferred.

The integral gain of the integrating controller circuit is determined by the adjustment of the potentiometer 197. The overall integral gain constant of the preferred circuit illustrated will, of course, be dependent upon both the proportional gain setting of the potentiometer 195 and the integral gain setting of the potentiometer 197. The sweep terminal of the potentiometer 197 is connected through a resistor 201 to the input terminal of a transistor pair combination normally referred to in the art as a dual-junction field effect transistor (FET) 202. In general terms, the transistor 202 along with its associated circuitry and the operational amplifier 203 perform the same function as a standard operational amplifier, and in many applications a standard operational amplifier could be used in its place. The use of a dual-junction FET as illustrated is preferred, however, due to the ability of the circuit to provide extremely stable amplification and high input impedance so that accurate integration of signals can be achieved over long periods of time without difficulties resulting from current leakage or other similar difficulties. The transistor circuit is connected through a resistor 205 to a positive voltage source $V_2$ and the output terminals thereof are connected through the series combination of a resistor 206, a potentiometer 207, and a resistor 208 with the sweep terminal of the potentiometer 207 being connected through a negative voltage supply $-V_2$. The output terminals of the FET 202 are also connected as illustrated to the inputs of the operational amplifier 203. The output of the amplifier 203 is connected through a capacitor 211 to the input of the transistor pair 202 to provide capacitor feedback effecting integration of the signal applied to the circuit to the resistor 201. A zener diode 212 is connected between the output of the amplifier 203 and ground in order to prevent generation of amplifier 203 output signals which could result in "wind-up" of the integration circuit.

An integrator reset and initialization circuit illustrated by FIG. 6 comprises a switch means 215 having associated therewith an actuating means 216 which will close the switch 215 upon application of a predetermined signal to a terminal 217. A diode 218 between the terminal 217 and ground prevents actuation of the switch means 215 by a signal of incorrect polarity. When a proper reset signal is applied to the terminal 217, the switch means 215 is closed and the capacitor 211 is discharged through a resistor 221. The circuit of FIG. 6 is also equipped with means for initializing the charge on the capacitor 221 at the time it is reset by applying a voltage at the junction between resistors 201 and 221 when the switch 215 is closed. The voltage thus applied is determined by an initialization signal $V_1$ applied across a potentiometer 222 to ground with the sweep terminal of the potentiometer providing a voltage to a yield to gain voltage follower or buffer amplifier 223. The output of the amplifier 223 applied through a resistor 224 provides the voltage which can be used to initialize the charge on the capacitor 221.

The output of the amplifier 203, representing the integral portion of the signal generated by the proportional-integral controller of FIG. 6 is applied through a resistor 231 to the noninverting input of an operational amplifier 232. The output of the amplifier 192, representing the proportional portion of the signal generated by the proportional-integral controller of FIG. 6, is applied through a resistor 233 to the inverting terminal of the same amplifier 232. The noninverting terminal of the amplifier 232 is connected through a resistor 235 to ground, and the output terminal of the amplifier 232 is connected through a resistor 236 to the inverting input terminal thereof. While the general configuration of the circuit associated with amplifier 232 is one of a subtracting amplifier, the control signal 27 is representative of the sum of the proportional and integral signals generated by the circuit of FIG. 6. This is apparent when it is considered that although the output of the amplifier 192 is applied directly through the input resistor 233 to the operational amplifier 232, the circuit providing the integral portion of the controller output performs a signal inversion in generating the integrated output signal. Subtracting the proportional signal from the integral signal therefore provides the same controller output signal 27 as would inverting one of the signals to provide uniform polarity then adding the signals. The apparatus and method of the invention can obviously be implemented in many ways utilizing the disclosure provided herein. For example, it may be desirable to provide resetting circuits for capacitors 151 and 157 of FIG. 4 in much the same manner that a resetting circuit is proviced for the capacitor 211 of FIG. 6. If desired, a meter or other measuring or recording instrument can be connected between the output of amplifier 123 and the output of amplifier 182 in order to continuously monitor or to provide a recording of the difference between the process measurement signal 11 and the set point signal 25. In the presently preferred analog embodiment of the invention illustrated by FIGS. 3–6, the following circuit components have been found to operate satisfactorily and are presently preferred:

| | |
|---|---|
| Controller 111 | P.I. controller AAI component No. B03979 and derivative feedback sold by Applied Automation Inc. Pawhuska Rd., Bartlesville, Ok., 74003 |
| Analyzers 115 and 116 | Model 102 process chromatograph Applied Automation Inc. Bartlesville, Ok., 74003 |
| Resistor 201 | 50 megohms |
| Resistor 152 | 7.5 megohms |
| Resistor 156 | 5 megohms |
| Resistor 127 | 97.6 kilohms |
| Resistors 206 and 208 | 86.6 kilohms |
| Resistor 191 | 22.5 kilohms |
| Resistors 129, 141, 145, 161, 167, 174, 179, 183, 186, 187, 188, 221, 224, 231, 233, 235 and 236 | 20 kilohms |
| Resistors 122, 131, 134, 143, 155, 163 & 176 | 10 kilohms |
| Resistors 125 and 193 | 6.49 kilohms |
| Resistors 133 and 178 | 4.99 kilohms |
| Resistor 198 | 2.49 kilohms |
| Resistor 205 | 470 ohms |
| Resistor 121 | 250 ohms |
| Resistor 166 | 200 ohms |
| Resistor 196 | 100 ohms |
| Potentiometer 175 | 20 kilohms |
| Potentiometers 126, 128, 181, 195, 197, 207 and 222 | 10 kilohms |
| Potentiometer 165 | 5 kilohms |
| Capacitors 151 and 211 | 10 microfarad |
| Capacitor 157 | 1 microfarad |
| Capacitor 146 | 0.005 microfarad |
| Dual-junction FET 202 | 2N3955 |
| Operational amplifier 153 | Model 3522J Burr-Brown Research Corp. International Airport Ind.Park Tucson, Arizona 85706 |
| Operational amplifiers 123, 132, 142, 162 171, 177, 182, 185, 192, 203, 223 and 232 | Type TC 741 - Motorola, Inc. or Model F7537 -Fairchild Camera Instrument Corp. Mt. View, Calif. 94042 |
| Zener Diode 212 | IN 5241B sold by Motorola, Inc. Phoenix, Ariz. 85008 |

While the invention has been illustrated in conjunction with a preferred analog embodiment thereof, those skilled in the art will be able to implement the method and apparatus of the invention using various equivalent apparatus including, for example, a programmed digital computer. Implementation of the apparatus and method of the invention utilzing a programmed digital computer is particularly advantageous in those situations where an existing computing capability can be used to provide appropriate control without the need for investment of a substantial amount of additional electronic equipment. These and other variations and modifications will be apparent to those skilled in the art within the scope of the foregoing specification of the invention and of the appended claims thereto.

What is claimed is:

1. Apparatus comprising:
   second or higher order lag means for accepting a process measurement signal and delivering in response thereto a lagged process measurement signal;
   differentiator means for accepting said lagged process measurement signal and delivering in response thereto a derivative signal representative of the time derivative of said lagged process measurement signal; and signal combining means for accepting said process measurement signal and said derivative signal and delivering in response thereto a process variable signal representative of the weighted sum of said process measurement signal and said derivative signal.

2. Apparatus in accordance with claim 1 wherein said signal combining means comprises:
first scaling means for applying a first scaling factor to said process measurement signal to produce a scaled process measurement signal;
second scaling means for applying a second scaling factor to said derivative signal to produce a scaled lagged derivative signal; and
adding means for adding said scaled process measurement signal and said scaled derivative signal to produce said process variable signal.

3. Apparatus in accordance with claim 1 wherein said signal combining means comprises:
scaling means for accepting said derivative signal and delivering in response thereto a scaled derivative signal representative of the product of said derivative signal and a preselected scaling factor; and
adding means for accepting said process measurement signal and said scaled derivative signal and delivering in response thereto a process variable signal representative of the sum of said process measurement signal and said scaled derivative signal.

4. Apparatus in accordance with claim 1 wherein said process variable signal satisfies the condition $$V_p = K_1 M_p + K_2 \frac{dM_{p1}}{dt}$$

where $V_p$ is said process variable signal, $M_p$ is said process measurement signal, $M_{p1}$ is said lagged process measurement signal, t is time, and $K_1$ and $K_2$ are constants not equal to zero.

5. Apparatus in accordance with claim 1 additionally comprising
controller means for accepting said process variable signal and a process variable set point signal representative of a desired value of said process variable signal as inputs and delivering in response thereto a process control signal.

6. Apparatus in accordance with claim 5 wherein said controller means comprises a proportional-integral controller.

7. Apparatus in accordance with claim 6 wherein said signal combining means comprises:
first scaling means for applying a first scaling factor to said process measurement signal to produce a scaled process measurement signal;
second scaling means for applying a second scaling factor to said derivative signal to produce a scaled lagged derivative signal; and
adding means for adding said scaled process measurement signal and said scaled derivative signal to produce said process variable signal.

8. Apparatus in accordance with claim 6 wherein said signal combining means comprises:
scaling means for accepting said derivative signal and delivering in response thereto a scaled derivative signal representative of the product of said derivative signal and a preselected scaling factor; and
adding means for accepting said process measurement signal and said scaled derivative signal and delivering in response thereto a process variable signal representative of the sum of said process measurement signal and said scaled derivative signal.

9. Apparatus in accordance with claim 6 wherein said process control signal satisfies the condition $$C_p = K_3 (V_p - SP) + K_4 \int (V_p - SP) \, dt$$

where $C_p$ is said process control signal, $V_p$ is said process variable signal, SP is said set point signal, $t$ is time, and $K_3$ and $K_4$ are constants not equal to zero.

10. Apparatus in accordance with claim 9 wherein said process variable signal satisfies the condition $$V_p = K_1 M_p + K_2 \frac{dM_{p1}}{dt}$$

where $V_p$ is said process variable signal, $M_p$ is said process measurement signal, $M_{p1}$ is said lagged process measurement signal, $t$ is time, and $K_1$ and $K_2$ are constants not equal to zero.

11. Apparatus in accordance with claim 6 additionally comprising:
ammonia synthesis reactor means for converting hydrogen and nitrogen to ammonia;
feed gas conduit means for supplying a flow of hydrogen-containing material to said synthesis reactor means;
air conduit means for supplying a flow of nitrogen-containing material to said synthesis reactor means; and
means for controlling the flow of air through said air conduit means to said ammonia synthesis reactor in response to said process control signal.

12. Apparatus in accordance with claim 11 wherein said means for controlling the flow of air comprises:
second controller means for comparing said process control signal with a second process measurement signal and generating an air flow control signal in response to said comparison; and
means for altering the flow rate of air to said ammonia synthesis reaction in response to said air flow control signal.

13. A method for generating a process variable signal, said method comprising:
generating a process measurement signal representative of the value of a preselected process parameter;
applying a second or higher order lag factor to said process measurement signal to produce a lagged process measurement signal;
generating, in response to said lagged process measurement signal, a derivative signal representative of the time derivative of said lagged process measurement signal; and
generating, in response to said process measurement signal and said derivative signal, a process variable signal representative of the weighted sum of said process measurement signal and said derivative signal.

14. A method in accordance with claim 13 wherein said process variable signal satisfies the condition $$V_p = K_1 M_p + K_2 \frac{dM_{p1}}{dt}$$

where $V_p$ is said process variable signal, $M_p$ is said process measurement signal, $M_{p1}$ is said lagged process measurement signal, $t$ is time, and $K_1$ and $K_2$ are constants not equal to zero.

15. A method in accordance with claim 13 wherein the response of said lagged process measurement signal to a unit step change in said process measurement signal satisfies the general condition $$M_{p1}(S) = M_p(S) \left( \frac{K_1}{C_1 S - 1} \right) \left( \frac{K_2}{C_2 S - 1} \right) \cdots \left( \frac{K_n}{C_n S - 1} \right)$$

where $M_{p1}$ is said lagged process measurement signal, $M_p$ is said process measurement signal, $C_1, C_2, \ldots C_n$ and $K_1, K_2, \ldots K_n$ are constants, and $n$ is an integer greater than 1.

16. A method for generating a process control signal, said method comprising:
  generating a process measurement signal representative of the value of a preselected process parameter;
  applying a second or higher order lag factor to said process measurement signal to produce a lagged process measurement signal;
  generating, in response to said lagged process measurement signal, a derivative signal representative of the time derivative of said lagged process measurement signal;
  generating, in response to said process measurement signal and said derivative signal, a process variable signal representative of the weighted sum of said process measurement signal and said derivative signal;
  comparing said process variable signal with a set point signal to produce a process variable error signal; and
  generating a process control signal bearing a predetermined relationship to said process variable error signal.

17. A method in accordance with claim 16 wherein said process control signal satisfies the condition $$C_p = K_3 E + K_4 \int E \, dt$$

where $C_p$ is said process control signal, $E$ is said process variable error signal, $t$ is time, and $K_3$ and $K_4$ are constants not equal to zero.

18. A method in accordance with claim 17 wherein the response of said lagged process measurement signal to a unit step change in said process measurement signal satisfies the general condition $$M_{p1}(S) = M_p(S) \left( \frac{K_1}{C_1 S - 1} \right) \left( \frac{K_2}{C_2 S - 1} \right) \cdots \left( \frac{K_n}{C_n S - 1} \right)$$

where $M_{p1}$ is said lagged process measurement signal, $M_p$ is said process measurement signal, $C_1, C_2, \ldots C_n$ and $K_1, K_2, \ldots K_n$ are constants, and $n$ is an integer greater than 1.

19. A method in accordance with claim 18 wherein said process variable signal satisfies the condition $$V_p = K_1 M_p + K_2 \frac{dM_{p1}}{dt}$$

where $V_p$ is said process variable signal, $M_p$ is said process measurement signal, $M_{p1}$ is said lagged process measurement signal, $t$ is time, and $K_1$ and $K_2$ are constants not equal to zero.

20. A method of controlling the air flow to an ammonia synthesis reaction, said method comprising:
  generating a first process measurement signal representative of the ratio of hydrogen to nitrogen entering the synthesis reaction zone;
  applying a second or higher order lag factor to said process measurement signal to produce a lagged process measurement signal;
  generating, in response to said lagged process measurement signal, a derivative signal representative of the time derivative of said lagged process measurement signal;
  generating, in response to said process measurement signal and said derivative signal, a process variable signal representative of the weighted sum of said process measurement signal and said derivative signal;
  employing said process variable signal as the variable input to a first controller producing a first process control signal in response to a comparison of said process variable signal and a preselected set point signal; and
  controlling the flow of air to said reaction zone in response to said first process control signal.

21. A method in accordance with claim 20 wherein the response of said lagged process measurement signal to a unit step change in said process measurement signal satisfies the general condition $$M_{p1}(S) = M_p(S) \left( \frac{K_1}{C_1 S - 1} \right) \left( \frac{K_2}{C_2 S - 1} \right) \cdots \left( \frac{K_n}{C_n S - 1} \right)$$

where $M_{p1}$ is said lagged process measurement signal, $M_p$ is said process measurement signal, $C_1, C_2, \ldots C_n$ and $K_1, K_2, \ldots K_n$ are constants, and $n$ is an integer greater than 1.

22. A method in accordance with claim 21 wherein said process variable signal satisfies the condition $$V_p = K_1 M_p + K_2 \frac{dM_{p1}}{dt}$$

where $V_p$ is said process variable signal, $M_p$ is said process measurement signal, $M_{p1}$ is said lagged process measurement signal, $t$ is time, and $K_1$ and $K_2$ are constants not equal to zero.

23. A method in accordance with claim 22 wherein said process control signal satisfies the condition $$C_p = K_3 E + K_4 E \, dt$$

where $C_p$ is said process control signal, $E$ is said process variable error signal, $t$ is time, and $K_3$ and $K_4$ are constants not equal to zero.

24. A method in accordance with claim 23 wherein controlling the flow of air to said reaction zone comprises:
  generating a second process measurement signal representative of the hydrogen to nitrogen ratio upstream from the introduction of any recycle stream from the synthesis reaction zone into the stream leading to said synthesis reaction zone;

employing said second process measurement signal and said first process control signal as inputs to a second process controller producing a second process control signal in response to a comparison of said second process measurement signal and said first process control signal; and controlling the flow of air to said reaction zone in response to said second process control signal.

25. A method in accordance with claim 15 wherein said lag factor is a second order lag factor.

26. A method in accordance with claim 18 wherein said lag factor is a second order lag factor.

27. A method in accordance with claim 21 wherein said lag factor is a second order lag factor.

* * * * *

UNITED STATES PATENT AND TRADEMARK OFFICE
CERTIFICATE OF CORRECTION

PATENT NO. : 4,069,413

DATED : January 17, 1978

INVENTOR(S) : Robert W. Rutledge

It is certified that error appears in the above–identified patent and that said Letters Patent are hereby corrected as shown below:

Column 18, claim 23, line 59, in the equation, between "$K_4$" and "E", insert --- $f$ ---.

Signed and Sealed this

Twenty-fifth Day of September 1979

[SEAL]

Attest:

Attesting Officer

LUTRELLE F. PARKER

Acting Commissioner of Patents and Trademarks